(12) United States Patent
Imagawa

(10) Patent No.: US 10,091,404 B2
(45) Date of Patent: Oct. 2, 2018

(54) ILLUMINATION APPARATUS, IMAGING SYSTEM, AND ILLUMINATION METHOD

(71) Applicant: Panasonic Intellectual Property Management Co., Ltd., Osaka (JP)

(72) Inventor: Taro Imagawa, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/351,765

(22) Filed: Nov. 15, 2016

(65) Prior Publication Data

US 2017/0064171 A1    Mar. 2, 2017

Related U.S. Application Data

(63) Continuation of application No. PCT/JP2016/001287, filed on Mar. 9, 2016.

(30) Foreign Application Priority Data

Jun. 12, 2015 (JP) .................................. 2015-118820

(51) Int. Cl.
*H04N 5/225* (2006.01)
*G03B 15/05* (2006.01)
(Continued)

(52) U.S. Cl.
CPC ........... *H04N 5/2256* (2013.01); *G03B 15/05* (2013.01); *H04N 5/217* (2013.01); *H04N 5/2351* (2013.01);
(Continued)

(58) Field of Classification Search
CPC .... H04N 5/217; H04N 5/3532; H04N 5/2256; H04N 5/2351; H04N 5/2353; H04N 5/2354; G03B 15/05
See application file for complete search history.

(56) References Cited

U.S. PATENT DOCUMENTS 7,706,674 B2* 4/2010 Sugimoto .............. G03B 15/03
                                                348/371
7,885,532 B2* 2/2011 Miyazaki ................ G03B 7/16
                                                396/157
(Continued)

FOREIGN PATENT DOCUMENTS

JP          8-006120         1/1996
JP         2005-236513       9/2005
(Continued)

OTHER PUBLICATIONS

International Search Report of PCT application No. PCT/JP2016/001287 dated May 31, 2016.
(Continued)

*Primary Examiner* — Lin Ye
*Assistant Examiner* — Chriss Yoder, III
(74) *Attorney, Agent, or Firm* — McDermott Will & Emery LLP

(57) ABSTRACT

The illumination apparatus according to the present disclosure emits illumination light to an object which is to be captured by an imaging apparatus that captures an imaging area for every predetermined capturing unit. The illumination apparatus includes a controller that acquires imaging information including a scanning timing from the imaging apparatus to calculate an imaging range of the imaging apparatus at each the scanning timing, determines an illumination range at each the scanning timing using a distance to the imaging apparatus from the object present within the imaging range and a positional relation between the imaging apparatus and the illumination apparatus, and controls emission of the illumination light to the determined illumination range in synchronization with the scanning timing.

10 Claims, 15 Drawing Sheets

(51) Int. Cl.
  *H04N 5/235* (2006.01)
  *H04N 5/217* (2011.01)
  *H04N 5/353* (2011.01)
(52) U.S. Cl.
  CPC ......... *H04N 5/2353* (2013.01); *H04N 5/2354* (2013.01); *H04N 5/3532* (2013.01)

(56) References Cited

U.S. PATENT DOCUMENTS

| | | | | |
|---|---|---|---|---|
| 8,228,423 B2 * | 7/2012 | Tamura | ................ | H04N 5/3532 348/296 |
| 8,736,710 B2 * | 5/2014 | Spielberg | ............... | G03B 15/05 348/222.1 |
| 8,761,594 B1 * | 6/2014 | Gross | ................ | H04N 5/2256 396/155 |
| 2005/0178950 A1 | 8/2005 | Yoshida | | |
| 2007/0023660 A1 | 2/2007 | Seger et al. | | |
| 2008/0198280 A1 | 8/2008 | Hikmet et al. | | |
| 2008/0205075 A1 | 8/2008 | Hikmet et al. | | |
| 2008/0219004 A1 | 9/2008 | Ronda et al. | | |
| 2013/0077946 A1 | 3/2013 | Katsuda | | |
| 2014/0055771 A1 * | 2/2014 | Oggier | ................... | G01S 17/89 356/5.01 |
| 2015/0350573 A1 | 12/2015 | Toda et al. | | |

FOREIGN PATENT DOCUMENTS

| | | |
|---|---|---|
| JP | 2009-500803 | 1/2009 |
| JP | 4204558 B | 1/2009 |
| JP | 2013-118429 | 6/2013 |
| JP | 2014-150412 | 8/2014 |
| JP | 2015-513825 | 5/2015 |

OTHER PUBLICATIONS

Kaiming He, Jian Sun, and Xiaoou Tang, "Single image haze removal using dark channel prior", IEEE Transactions on Pattern Analysis and Machine Intelligence, vol. 33, No. 12, 2341-2353, Dec. 2011.

* cited by examiner 301  302

301  302

ILLUMINATION APPARATUS, IMAGING SYSTEM, AND ILLUMINATION METHOD

BACKGROUND

1. Technical Field

The present disclosure relates to an illumination apparatus that emits illumination light to an imaging target, an imaging system, and an illumination method.

2. Description of the Related Art

NPL 1 discloses a method for removing scattering light caused by haze (fog, smoke, etc.) included in image by image processing. With this method, an influence of scattering light that varies depending on distances to an object is estimated using Dark Channel Prior, and thus, an image from which scattering light is removed can be obtained.

CITATION LIST

Non-Patent Literature

NPL1: He, Kaiming, Jian Sun, and Xiaoou Tang. "Single image haze removal using dark channel prior." Pattern Analysis and Machine Intelligence, IEEE Transactions on 33.12 (2011): 2341-2353

SUMMARY

The present disclosure provides an illumination apparatus that is effective for capturing an image while reducing an influence of scattering of illumination light due to a scattering medium (fog or underwater haze), when an image is captured in air or in water using illumination.

The illumination apparatus according to the present disclosure emits illumination light to an object which is to be captured by an imaging apparatus that captures an imaging area for every predetermined capturing unit. The illumination apparatus includes a controller that acquires imaging information including a scanning timing from the imaging apparatus to calculate an imaging range of the imaging apparatus at each the scanning timing, determines an illumination range at each the scanning timing using a distance to the imaging apparatus from the object present within the imaging range and a positional relation between the imaging apparatus and the illumination apparatus, and controls emission of the illumination light to the determined illumination range in synchronization with the scanning timing.

An imaging system according to the present disclosure includes an imaging apparatus that captures an imaging area for every predetermined capturing unit, and at least one illumination apparatus that emits illumination light to an object to be captured by the imaging apparatus. The illumination apparatus includes a controller that acquires imaging information including a scanning timing from the imaging apparatus to calculate an imaging range of the imaging apparatus at each the scanning timing, determines an illumination range at each the scanning timing using a distance to the imaging apparatus from the object present within the imaging range and a positional relation between the imaging apparatus and the illumination apparatus, and controls emission of the illumination light to the determined illumination range in synchronization with the scanning timing.

An illumination method according to the present disclosure is for emitting illumination light from an illumination apparatus to an object which is to be captured by an imaging apparatus that captures an imaging area for every predetermined capturing unit. The illumination method includes: acquiring imaging information including a scanning timing from the imaging apparatus to calculate an imaging range of the imaging apparatus at each the scanning timing; determining an illumination range at each the scanning timing using a distance to the imaging apparatus from the object present within the imaging range and a positional relation between the imaging apparatus and the illumination apparatus; and emitting the illumination light to the determined illumination range in synchronization with the scanning timing.

According to the present disclosure, an influence of scattering light due to a scattering medium can be reduced in capturing an image in air or in water.

DETAILED DESCRIPTION

Figure 1:
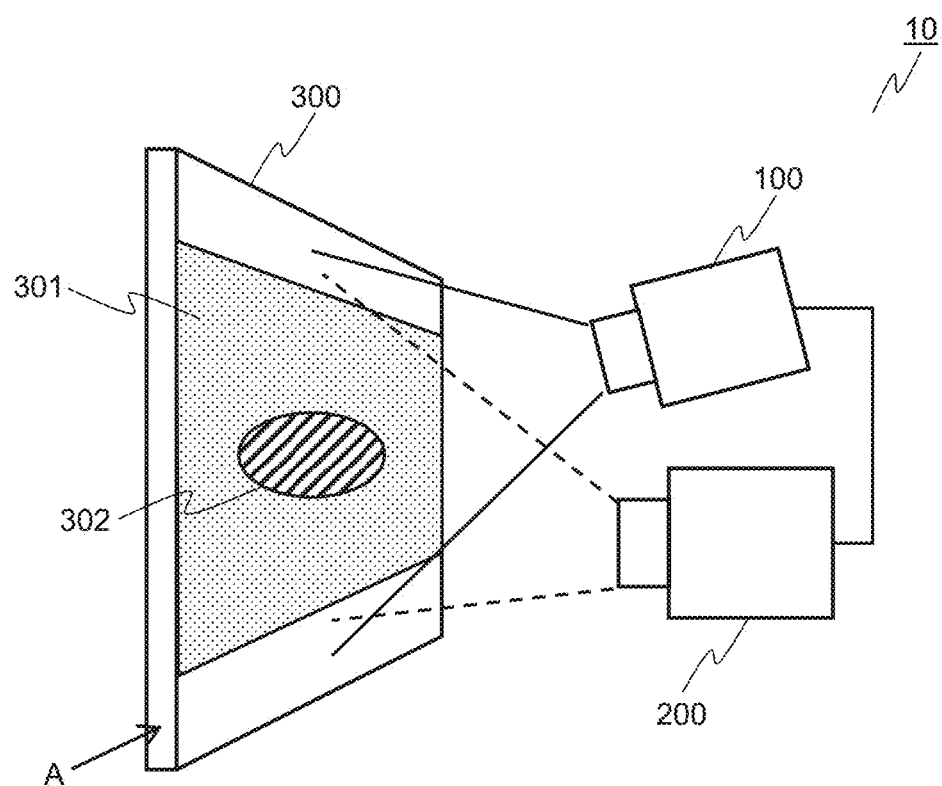
FIG. 1 is a schematic diagram illustrating an imaging system according to a first exemplary embodiment.

Exemplary embodiments will be described below in detail with reference to the drawings as necessary. However, more than necessary detailed descriptions will sometimes be omitted. For example, detailed descriptions for matters which have already been well known in the art and redundant descriptions for substantially the same configurations will sometimes be omitted. This is to prevent the description below from becoming unnecessarily redundant to facilitate understanding of a person skilled in the art.

Note that the accompanying drawings and the following description are provided in order for a person skilled in the art to sufficiently understand the present disclosure, and they are not intended to limit the subject matter set forth in the claims.

Further, each diagram is schematic, and does not provide an exact illustration in a strict sense. In addition, in each diagram, the same components are denoted by the same reference numerals.

First Exemplary Embodiment

A first exemplary embodiment will be described below with reference to FIGS. 1 to 9.

[1-1. Configuration]

[1-1-1. Outline]

FIG. 1 is a schematic diagram illustrating imaging system 10 according to the first exemplary embodiment. As illustrated in FIG. 1, imaging system 10 includes illumination apparatus 100 and imaging apparatus 200. Illumination apparatus 100 emits illumination light to object 300 which is to be captured by imaging apparatus 200. Imaging apparatus 200 captures an image of object 300, to which illumination light is emitted from illumination apparatus 100, for every predetermined capturing unit to generate a captured image. Object 300 is an outer wall of a building in the present disclosure, for example. Further, as illustrated in FIG. 1, the present exemplary embodiment describes, as one example, the case where imaging apparatus 200 captures imaging area 301 of object 300, imaging area 301 including defective portion 302 such as damage (crack, etc.) or dirt.

Figure 2:
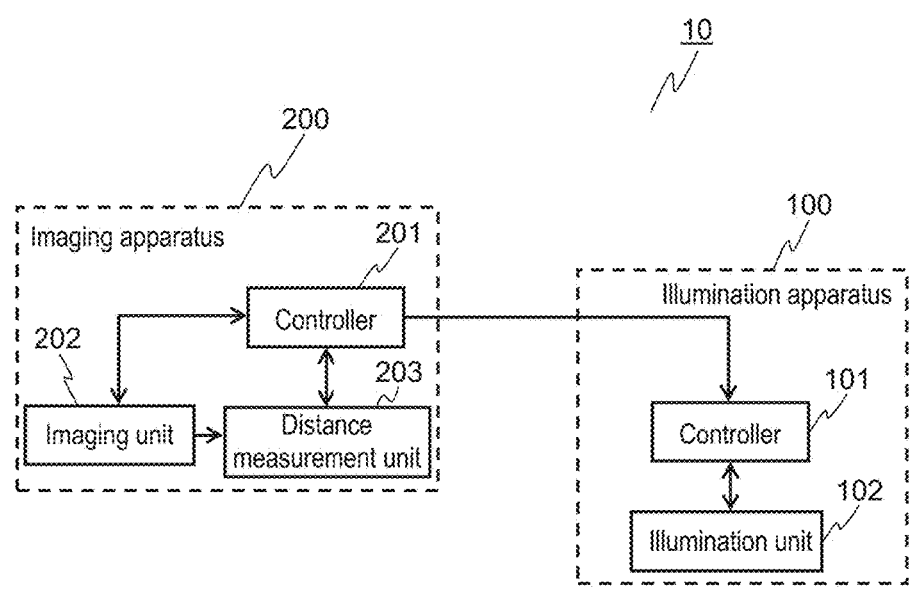
FIG. 2 is a block diagram illustrating a functional configuration of the imaging system according to the first exemplary embodiment.

The detailed configurations of illumination apparatus 100 and imaging apparatus 200 will be described below with reference to FIG. 2. FIG. 2 is a block diagram illustrating a functional configuration of imaging system 10 according to the present exemplary embodiment.

[1-1-2. Imaging Apparatus]

Imaging apparatus 200 is a digital video camera or an on-vehicle camera, for example. In the present exemplary embodiment, imaging apparatus 200 is a TOF (Time Of Flight) camera. As illustrated in FIG. 2, imaging apparatus 200 includes controller 201, imaging unit 202, and distance measurement unit 203.

Controller 201 includes, for example, a non-volatile memory that stores a program, a volatile memory that is a temporarily storage area for executing a program, an input/output port, a processor that executes a program, and the like. Controller 201 controls imaging performed by imaging unit 202 using imaging information. The imaging information includes information relating to imaging, such as a scanning timing or an exposure time.

Further, controller 201 causes distance measurement unit 203 to detect a distance to imaging unit 202 from object 300. Controller 201 transmits the imaging information for controlling imaging unit 202 and distance information detected by distance measurement unit 203 to illumination apparatus 100.

Imaging unit 202 has an optical system such as an image sensor and a lens. In the present exemplary embodiment, the image sensor in imaging unit 202 is a scanning CMOS image sensor. Imaging unit 202 captures an image of object 300, to which illumination light is emitted, to generate a captured image. Imaging unit 202 captures each of predetermined divided imaging ranges of imaging area 301, and scans a plurality of divided imaging ranges, thereby capturing the entire of imaging area 301.

Distance measurement unit 203 measures a distance to imaging area 301 of object 300 from imaging apparatus 200 using a TOF method, and generates a distance distribution. The distance distribution indicates a distribution of distances to object 300 viewed from imaging apparatus 200 or illumination apparatus 100 on a pixel basis. The distance distribution is also referred to as a depth map. Distance measurement unit 203 outputs the distance distribution to controller 201 as distance information.

Figure 3A:
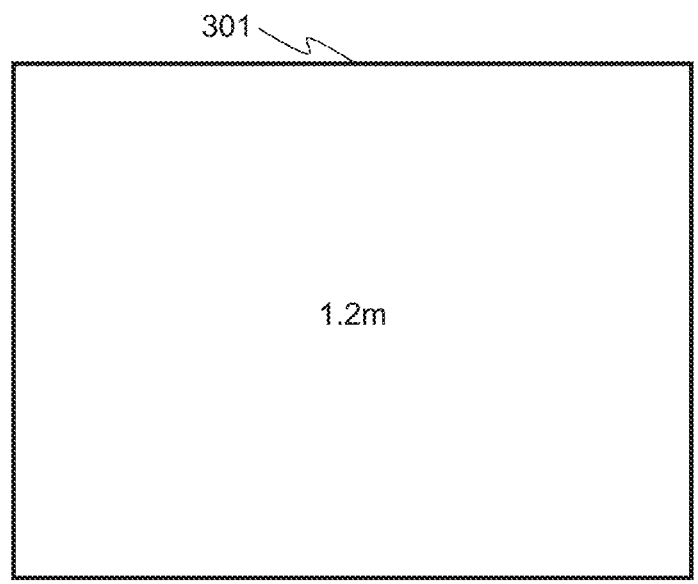
FIG. 3A is a diagram illustrating one example of a distance distribution.
Figure 3B:
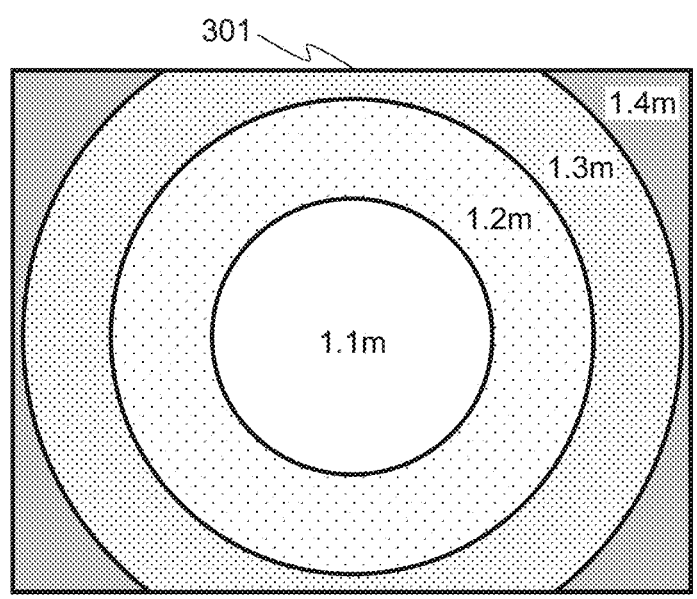
FIG. 3B is a diagram illustrating one example of a (detailed) distance distribution.

FIGS. 3A and 3B are diagrams illustrating one example of the distance distribution. For example, in imaging system 10 illustrated in FIG. 1, the distance distribution to imaging area 301 of object 300 captured by imaging apparatus 200 is as illustrated in FIG. 3A. FIG. 3A illustrates that object 300 in imaging area 301 is located at a position distant from imaging apparatus 200 by 1.2 m.

Also, FIG. 3B illustrates the distance distribution in the case where distances are detected in more detail in the same arrangement. FIG. 3B illustrates that object 300 in imaging area 301 is located at a position distant from imaging apparatus 200 by 1.1 m to 1.4 m. Note that object 300 does not always have a flat shape. In the present disclosure, the effect of the present disclosure can be obtained by using either of the distance distributions.

[1-1-3. Illumination Apparatus]

As illustrated in FIG. 2, illumination apparatus 100 includes controller 101 and illumination unit 102.

Illumination apparatus 100 is desirably disposed substantially on an axis of a scanning direction of imaging apparatus 200 to be away from imaging apparatus 200 by a predetermined distance. For example, when imaging apparatus 200 scans vertically, illumination apparatus 100 is desirably disposed above or below imaging apparatus 200. With this configuration, the effect of the present exemplary embodiment can easily be obtained.

In the present disclosure, it is supposed that imaging apparatus 200 scans vertically, and illumination apparatus 100 is disposed above imaging apparatus 200 as illustrated in FIG. 1. It is also supposed that the positional relation between imaging apparatus 200 and illumination apparatus 100 is preliminarily set to illumination apparatus 100 upon the installment of imaging system 10.

Controller 101 includes, for example, a non-volatile memory that stores a program, a volatile memory that is a temporarily storage area for executing a program, an input/output port, a processor that executes a program, and the like. Controller 101 acquires the imaging information and distance information from imaging apparatus 200. Controller 101 determines an illumination range and an illumination period of illumination light emitted from illumination unit 102 using the positional relation of imaging apparatus 200 and illumination apparatus 100 preliminarily set, based on the imaging information and the distance information, and controls illumination unit 102.

Illumination unit 102 emits illumination light to object 300 based on the illumination range and the illumination period determined by controller 101.

[1-2. Imaging Operation]

Figure 4:
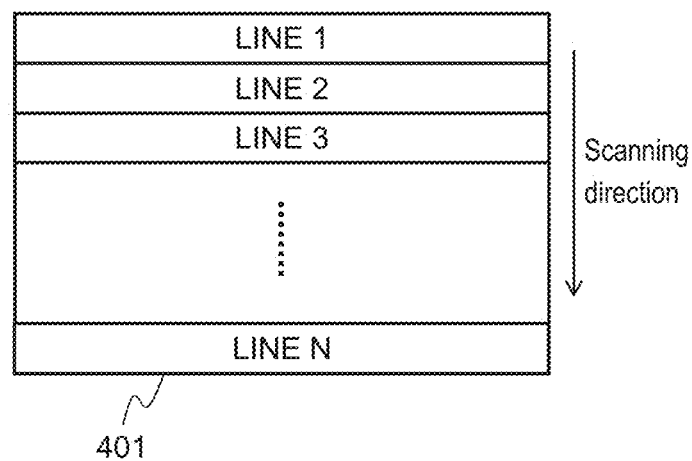
FIG. 4 is a diagram for describing a scanning timing of an imaging apparatus.
Figure 5:
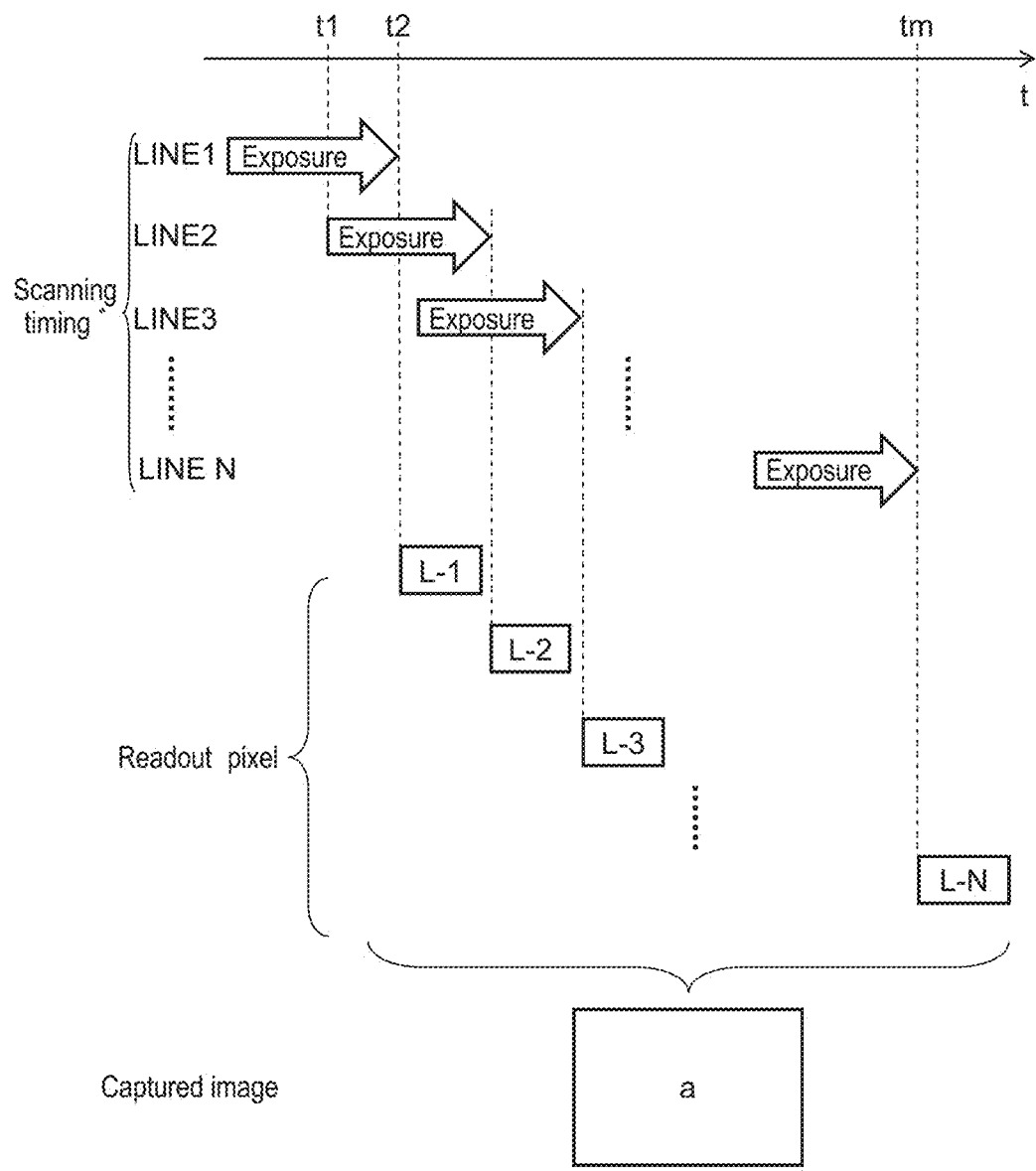
FIG. 5 is a diagram for describing an operation of the imaging apparatus.

FIG. 4 is a diagram for describing a scanning timing of imaging apparatus 200. FIG. 4 illustrates a scanning order of the CMOS image sensor in imaging unit 202. Controller 201 in imaging apparatus 200 controls such that imaging unit 202 sequentially scans from top to bottom, line by line, from line 1 to line N (an integer satisfying N>0) on imaging plane 401. FIG. 5 is a diagram for describing an operation of imaging apparatus 200. FIG. 5 illustrates the relation between a scanning timing and an exposure timing of imaging unit 202. In FIG. 5, a length of each arrow indicates an exposure time of imaging unit 202.

Controller 201 controls imaging unit 202 to sequentially scan at the scanning timing illustrated in FIG. 4. Simultaneously, controller 201 controls imaging unit 202 to expose the scanned line during the scanning by imaging unit 202. Controller 201 causes imaging unit 202 to read a pixel value on the line at a point of time when the exposure is ended. For example, imaging unit 202 reads pixel value L−1 for one line of line 1 at time t2 when the exposure of line 1 is ended. As illustrated in FIG. 5, after imaging of line N is ended, captured image a for one frame is obtained.

Imaging unit 202 starts imaging of the next frame after the imaging of the last line N is ended, according to the control of controller 201. Imaging unit 202 repeats the operation of scan, exposure, and reading of a pixel value, from line 1 to line N according to the scanning timing in the next frame as well.

In this case, the pixel value of captured image is determined according to an amount of light received by imaging unit 202 during the exposure period. At this time, when the exposure time is longer than the difference in the scanning timing between the present line and the adjacent line, the period in which the adjacent line is simultaneously exposed is generated. In FIG. 5, line 1 and line 2 are simultaneously exposed during the period from time t1 to time t2. As described above, when the exposure time for each line is longer, the number of the adjacent lines which are simultaneously exposed is increased.

Figure 6:
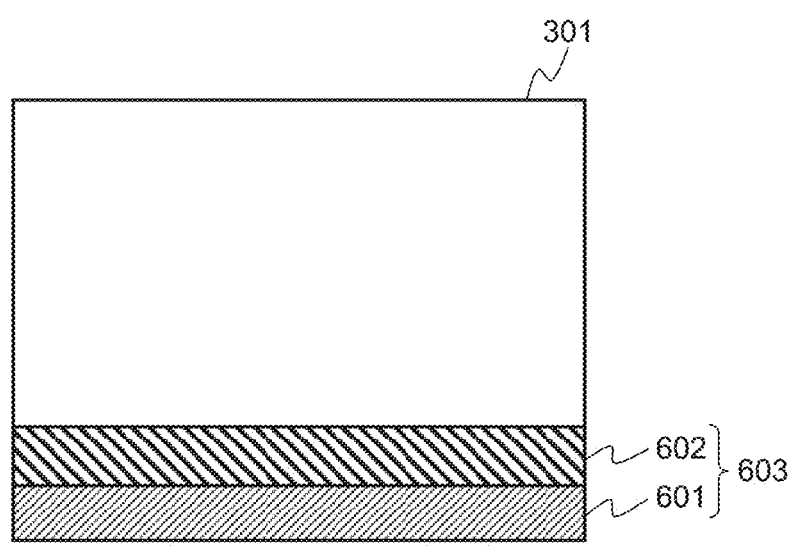
FIG. 6 is a diagram for describing an imaging range captured by an imaging unit.

FIG. 6 is a diagram for describing imaging range 603 of imaging unit 202. Imaging unit 202 captures imaging area 301 for every predetermined imaging range 603 according to the scanning timing. FIG. 6 illustrates imaging range 603 currently exposed by imaging unit 202 in imaging area 301 of one frame during the period from time t1 to time t2 in FIG. 5. As illustrated in FIG. 6, imaging range 603 is formed by scanning area 601 corresponding to line 1 and scanning area 602 corresponding to line 2 in FIG. 4. Notably, FIG. 6 illustrates that line 1 and line 2 in FIG. 4 are vertically and horizontally inverted, since an image is inversely formed on the image sensor in imaging unit 202.

[1-3. Illumination Mode]

Illumination apparatus 100 according to the present disclosure has two illumination modes, which are normal illumination and local illumination.

[1-3-1. Normal Illumination]

Figure 7:
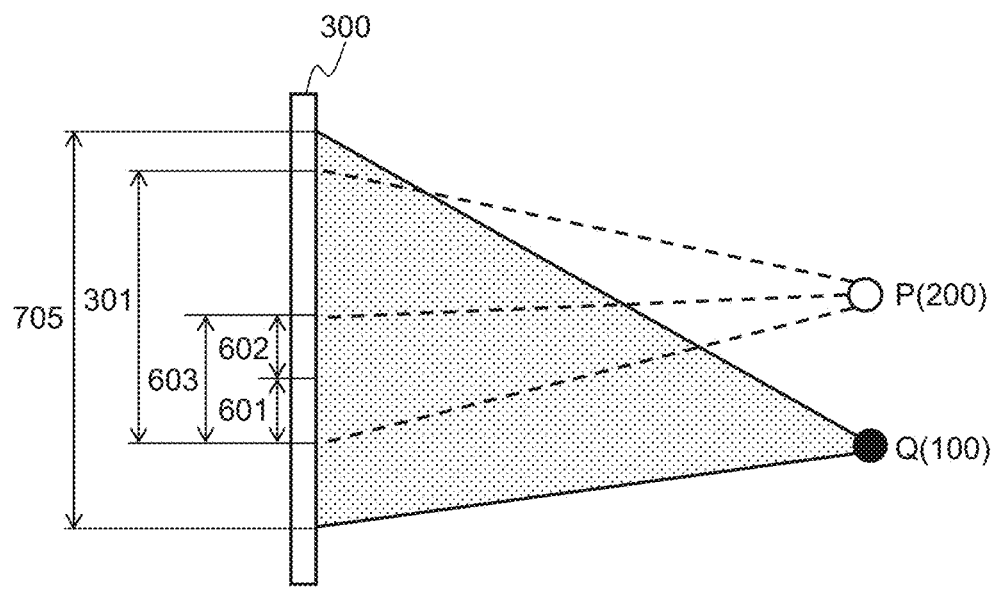
FIG. 7 is a diagram for describing an operation of normal illumination according to the first exemplary embodiment.

FIG. 7 is a diagram for describing an operation of the normal illumination according to the present exemplary embodiment. FIG. 7 illustrates object 300 that is an outer wall, viewed from a side face (from point A in FIG. 1).

FIG. 7 illustrates that imaging apparatus 200 captures imaging area 301 from point of view P in a unit of imaging range 603. Imaging range 603 in FIG. 7 is formed by scanning area 601 corresponding to line 1 and scanning area 602 corresponding to line 2 on imaging plane 401 in FIG. 4. FIG. 7 also illustrates that illumination apparatus 100 emits illumination light to illumination range 705 on object 300 from illumination position Q. As illustrated in FIG. 7, illumination range 705 in the normal illumination includes imaging area 301.

Specifically, imaging apparatus 200 sequentially captures imaging area 301 for each of imaging ranges 603 according to the scanning timing with the state in which illumination apparatus 100 illuminates illumination range 705.

[1-3-2. Local Illumination]

Figure 8:
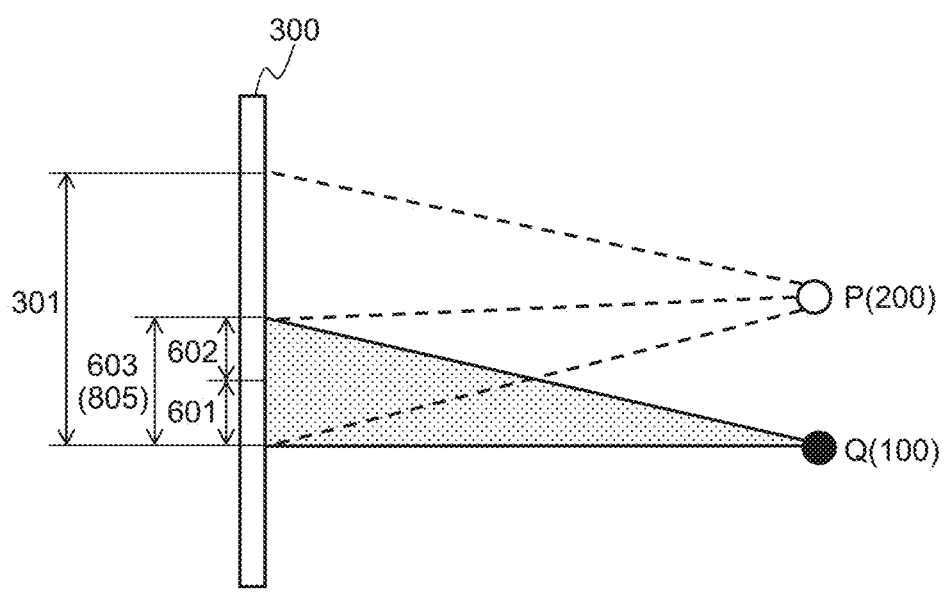
FIG. 8 is a diagram for describing an operation of local illumination according to the first exemplary embodiment.

FIG. 8 is a diagram for describing an operation of the local illumination according to the present exemplary embodiment. FIG. 8 illustrates object 300 that is an outer wall, viewed from a side face (from point A in FIG. 1).

FIG. 8 illustrates that imaging apparatus 200 captures imaging area 301 from point of view P in a unit of imaging range 603. Imaging range 603 in FIG. 8 is formed by scanning area 601 corresponding to line 1 and scanning area 602 corresponding to line 2 on imaging plane 401 in FIG. 4. FIG. 8 also illustrates that illumination apparatus 100 emits illumination light to imaging range 603 on object 300 from illumination position Q. Specifically, in the local illumination, illumination range 805 of illumination apparatus 100 substantially coincides with imaging range 603 of imaging apparatus 200.

[1-4. Illumination Operation]

Figure 9:
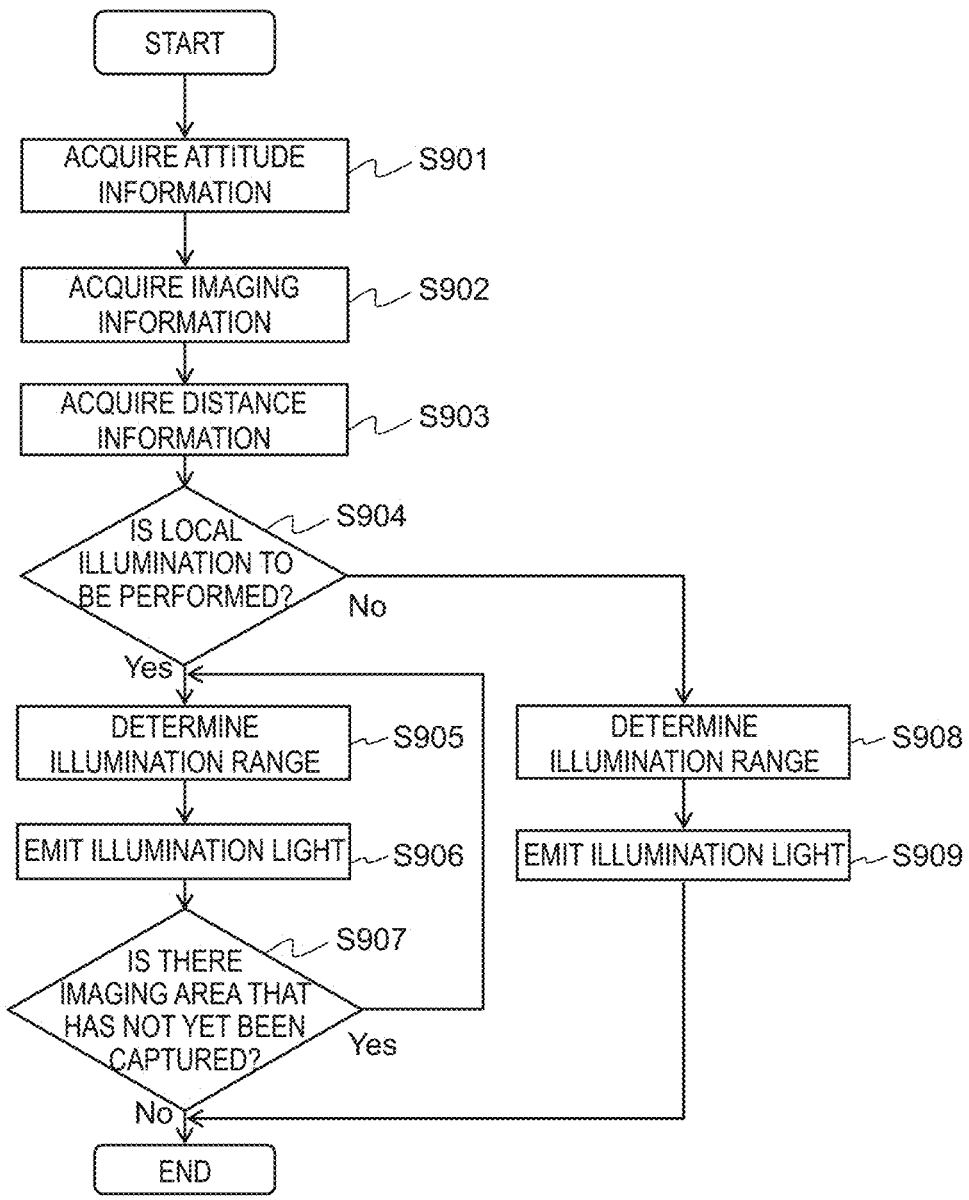
FIG. 9 is a flowchart for describing an operation of an illumination apparatus according to the first exemplary embodiment.

FIG. 9 is a flowchart for describing an operation (illumination method) of illumination apparatus 100 according to the present exemplary embodiment. FIG. 9 is a flowchart when an image for one frame is captured. Illumination apparatus 100 repeats this process for a required number of frames.

Firstly, controller 101 in illumination apparatus 100 acquires attitude information of imaging apparatus 200 to illumination apparatus 100, the information being preliminarily set. The attitude information includes position information and direction information indicating a three-dimensional relative relation between illumination apparatus 100 and imaging apparatus 200 (step S901). Here, the position information is indicated by three-dimensional coordinate system having an x axis, a y axis, and a z axis. In addition, the direction information is indicated by three rotation axes of a yaw axis, a pitch axis, and a roll axis.

Next, controller 101 acquires the imaging information of imaging unit 202 from imaging apparatus 200 (step S902). The imaging information includes information relating to a scanning timing, an exposure time, and an imaging area. Next, controller 101 acquires distance information of an object from imaging apparatus 200 (step S903). The distance information is a distance distribution from the object in imaging area 301 to imaging apparatus 200. Note that steps S901 to S903 may be simultaneously performed or may be performed in order other than this order.

Controller 101 determines whether the local illumination is to be performed or not using a predetermined condition (step S904). The predetermined condition will be described next.

Controller 101 may use an influence of scattering due to a scattering medium (scattering intensity of scattering light) as the predetermined condition, for example. When the influence of scattering is small, that is, when a scattering intensity is smaller than a predetermined value, controller 101 may switch to the normal illumination. Since the present exemplary embodiment uses characteristic of a camera using a general scanning CMOS image sensor, switching to normal imaging can quickly be performed by switching illumination to the normal illumination. By switching the illumination to the normal illumination according to a scattering intensity as described above, the calculation relating to the distance measurement or the determination of the illumination range can be reduced.

Further, when detecting a positional deviation of illumination light and determining that the positional deviation occurs, controller 101 may select the normal illumination. Controller 101 detects the degree of the positional deviation between illumination range 805 determined by controller 101 and illumination light actually emitted from illumination unit 102, and when the positional deviation becomes larger than a predetermined degree, controller 101 switches to the normal illumination.

In addition, when the distance information acquired from imaging apparatus 200 is not correct, or when the distance information cannot be acquired from imaging apparatus 200, controller 101 determines that a value of the distance is outside a predetermined range, and switches to the normal illumination.

It is to be noted that, since the method for detecting a scattering intensity or a positional deviation of an illumination range is not the nature of the present disclosure, the description thereof will be omitted. However, any method is usable, so long as a scattering intensity and a positional deviation of an illumination range can be detected.

When determining that the local illumination is not to be performed (No in step S904), controller 101 determines the range including imaging area 301 as illumination range 705 (step S908) as illustrated in FIG. 7. Controller 101 also determines that the period taken for imaging apparatus 200 to complete imaging for one frame as an illumination period. Illumination unit 102 emits illumination light to illumination range 705 determined by controller 101 during the determined illumination period (step S909). Note that controller 101 may illuminate a range including imaging area 301 at each scanning timing of imaging unit 202.

When determining that the local illumination is to be performed (Yes in step S904), controller 101 determines illumination range 805 using the acquired attitude information, the imaging information, and the distance information, at each scanning timing of imaging unit 202 (step S905). If point of view P of imaging apparatus 200 with respect to illumination position Q of illumination apparatus 100, the attitude information, and the distance information have already been known in FIG. 8, controller 101 can geometrically obtain illumination range 805 viewed from illumination position Q with respect to imaging range 603 that is now exposed by imaging unit 202. This procedure is the same as the idea of the general stereoscopy, and thus the detailed description will be omitted. Further, controller 101 determines the exposure time of imaging unit 202 as the illumination period.

Notably, a shape of an area actually captured by a line area on the image sensor in an actual space is affected by distortion of lenses in imaging apparatus 200. Accordingly, in the case where the influence of the lens distortion is not negligible, illumination range 805 is set to substantially coincide with imaging range 603 corresponding to the line area on the image sensor. The shape correction due to the lens distortion is used in a camera calibration technique for a stereo camera and distortion correction for a general digital camera. When the influence of the lens distortion is considered as described above, illumination range 805 can more exactly coincide with imaging range 603.

Controller 101 controls illumination unit 102 to emit illumination light to illumination range 805 determined in step S905 in synchronization with the scanning timing and the exposure time of imaging unit 202 (step S906). Controller 101 determines whether or not there is an area which has not yet been captured in imaging area 301 (step S907). When determining that there is an area which has not yet been captured in imaging area 301 (Yes in step S907), controller 101 returns to step S905.

Imaging unit 202 transfers to imaging of line 2 after ending the imaging of line 1. In this case, lines 2 and 3 are the imaging ranges that are the area now exposed. In the same manner as in line 1 and line 2, controller 101 obtains the direction in which the imaging range corresponding to lines 2 and 3 is viewed from illumination position Q, and determines illumination range 805. Illumination unit 102 illuminates the imaging range of object 300 in synchronization with the exposure period of imaging apparatus 200 for line 2 and line 3. Similarly for the succeeding scans, illumination range 805 is sequentially shifted according to the imaging range, and after the scan for the last line (line N) is finished, the process is ended, and the similar operation is repeated from line 1 as the illumination operation for the next frame. Here, in the case where the distance distribution of imaging area 301 is changed with time as in the case where object 300 is moving, illumination range 805 for the imaging of the same line is also changed.

When determining that the imaging of imaging area 301 is completed (No in step S907), controller 101 ends the imaging.

[1-5. Effects]

As described above, controller 101 in illumination apparatus 100 according to the present exemplary embodiment firstly acquires the imaging information including the scanning timing from imaging apparatus 200, and calculates imaging range 603 of imaging apparatus 200 at each scanning timing. Next, controller 101 determines an illumination range at each scanning timing using the distance to imaging apparatus 200 from object 300 present within the imaging range and the positional relation between imaging apparatus 200 and illumination apparatus 100. Then, controller 101 controls to emit illumination light to the determined illumination range in synchronization with the scanning timing.

Thus, in the case where a scattering medium is present between object 300 and imaging apparatus 200, scattering of illumination light can be reduced.

Accordingly, imaging apparatus 200 can capture a high contrast image. The effect of the present exemplary embodiment will be described below in detail.

Figure 10A:
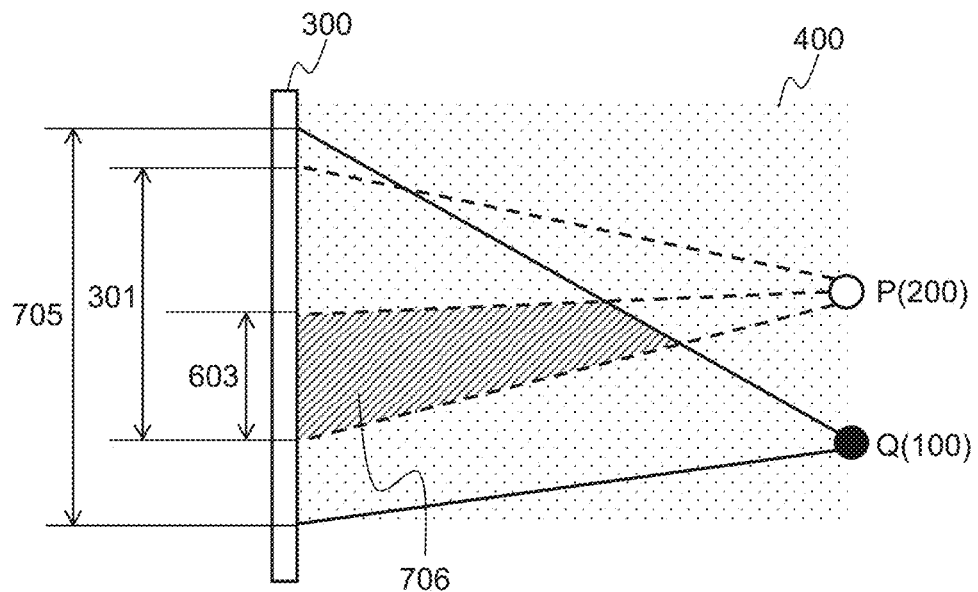
FIG. 10A is a diagram for describing an effect (normal illumination) of the imaging system according to the first exemplary embodiment.
Figure 10B:
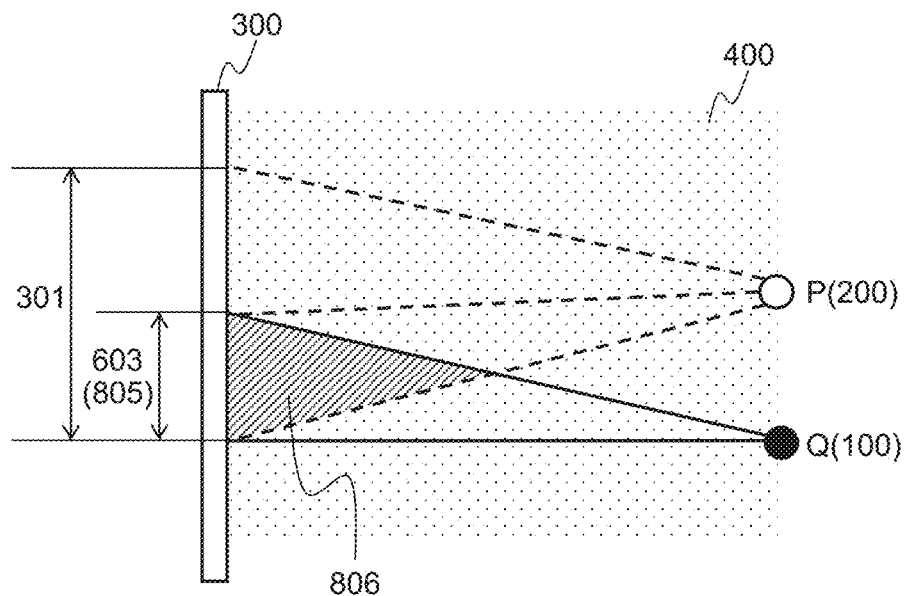
FIG. 10B is a diagram for describing an effect (local illumination) of the imaging system according to the first exemplary embodiment.

FIGS. 10A and 10B are diagrams for describing the illumination effect of imaging system 10 according to the first exemplary embodiment. FIG. 10A illustrates the illumination state in which scattering medium 400 is present between object 300 and imaging apparatus 200 in the normal illumination in FIG. 7. Also, FIG. 10B illustrates the illumination state in which scattering medium 400 is present between object 300 and imaging apparatus 200 in the local illumination in FIG. 8.

As illustrated in FIG. 10A, in the normal illumination, illumination apparatus 100 sets a range including imaging area 301 as illumination range 705. In this case, overlapped space 706 (a hatched portion in FIG. 10A) where the space enclosed by illumination position Q of illumination apparatus 100 and illumination range 705 and the space enclosed by point of view P of imaging apparatus 200 and imaging range 603 are overlapped with each other is generated. Overlapped space 706 is a space where an optical path of the illumination light illuminating illumination range 705 from illumination apparatus 100 and an optical path of reflection light exposing imaging apparatus 200 from imaging range 603 are overlapped with each other. Scattering light generated by scattering of rays passing through overlapped space 706 by scattering medium 400 is added to the image within imaging range 603. The state in FIG. 10A is similar to the states in other imaging ranges, and therefore, the description will be omitted. According to this, brightness of a captured image is increased, resulting in that a captured image having low contrast is obtained.

On the other hand, in the local illumination, illumination unit 102 illuminates only imaging range 603 that is now exposed as illustrated in FIG. 10B. In this case, overlapped space 806 (a hatched portion in FIG. 10B) where the space enclosed by illumination position Q of illumination apparatus 100 and illumination range 805 (imaging range 603) and the space enclosed by point of view P of imaging apparatus 200 and imaging range 603 are overlapped with each other is generated. Overlapped space 806 is a space where an optical path of the illumination light illuminating illumination range 805 (imaging range 603) from illumination apparatus 100 and an optical path of reflection light exposing imaging apparatus 200 from imaging range 603 are overlapped with each other. In this case as well, scattering light by scattering medium 400 is generated in overlapped space 806, and added to an image within imaging range 603. The state in FIG. 10B is similar to the states in other imaging ranges, and therefore, the description will be omitted. As is understood from FIGS. 10A and 10B, overlapped space 806 in the local illumination is smaller than overlapped space 706 in the normal illumination, so that the influence of scattering light exerted on a captured image is reduced. Accordingly, the deterioration in contrast of a captured image can be reduced.

Figure 11A:
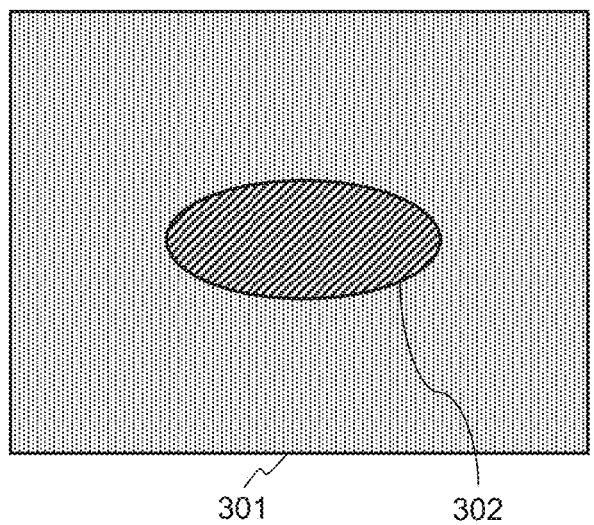
FIG. 11A is a diagram for describing a captured image captured with normal illumination according to the first exemplary embodiment.
Figure 11B:
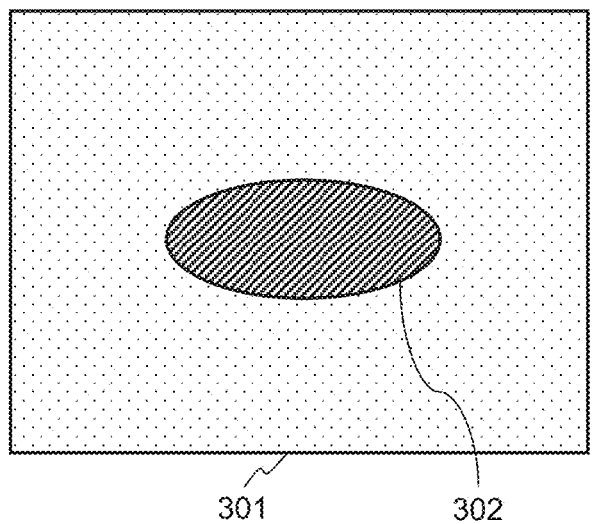
FIG. 11B is a diagram for describing a captured image captured with local illumination according to the first exemplary embodiment.

FIGS. 11A and 11B are diagrams illustrating one example of a captured image according to the first exemplary embodiment. FIG. 11A illustrates a captured image captured in the normal illumination, while FIG. 11B illustrates a captured image captured in the local illumination.

In the captured image in FIG. 11A, defective portion 302 in object 300 has brightness close to peripheral brightness due to the influence of scattering light, resulting in that the image has low contrast by which defective portion 302 is hard to be visually recognized. On the other hand, the captured image in FIG. 11B keeps contrast of object 300 due to suppression of scattering light by the local illumination, which makes it easy to visually recognize defective portion 302.

The above effect can be obtained by reducing the occurrence of scattering light, which affects a captured image, with use of the local illumination according to the feature of instantaneous local imaging of an image sensor based on this feature. Therefore, the effect of the present disclosure is easily obtained by shortening the exposure time and narrowing the instantaneous imaging area.

As for the positional relation between illumination apparatus 100 and imaging apparatus 200, it is desirable that illumination apparatus 100 is disposed in the scanning direction (vertical direction in FIG. 4) with respect to imaging apparatus 200. This is because, according to this configuration, the overlapped range of the optical path of illumination light from illumination apparatus 100 and the exposure area of imaging apparatus 200 can be decreased. Further, if imaging apparatus 200 and illumination apparatus 100 are closely provided, scattering area 806 (area where scattering light is superimposed) illustrated in FIG. 10B is increased. In view of this, it is desirable that illumination apparatus 100 is provided at a position distant from imaging apparatus 200 to generate a difference between an illumination direction and a imaging direction.

As described above, the present exemplary embodiment provides the effect capable of reducing an influence of scattering illumination light while characteristics of a camera using a general scanning CMOS image sensor is utilized, and the present exemplary embodiment is applicable to not only a still image but also a moving image.

Second Exemplary Embodiment

A second exemplary embodiment will be described below with reference to FIGS. 12 to 16. In general, there may be the case in which a plurality of illumination ways is combined to illuminate an imaging range with illumination intensity as uniform as possible and as sufficient as possible. The second exemplary embodiment describes an illumination method using a plurality of illumination apparatuses.

[2-1. Configuration]

Figure 12:
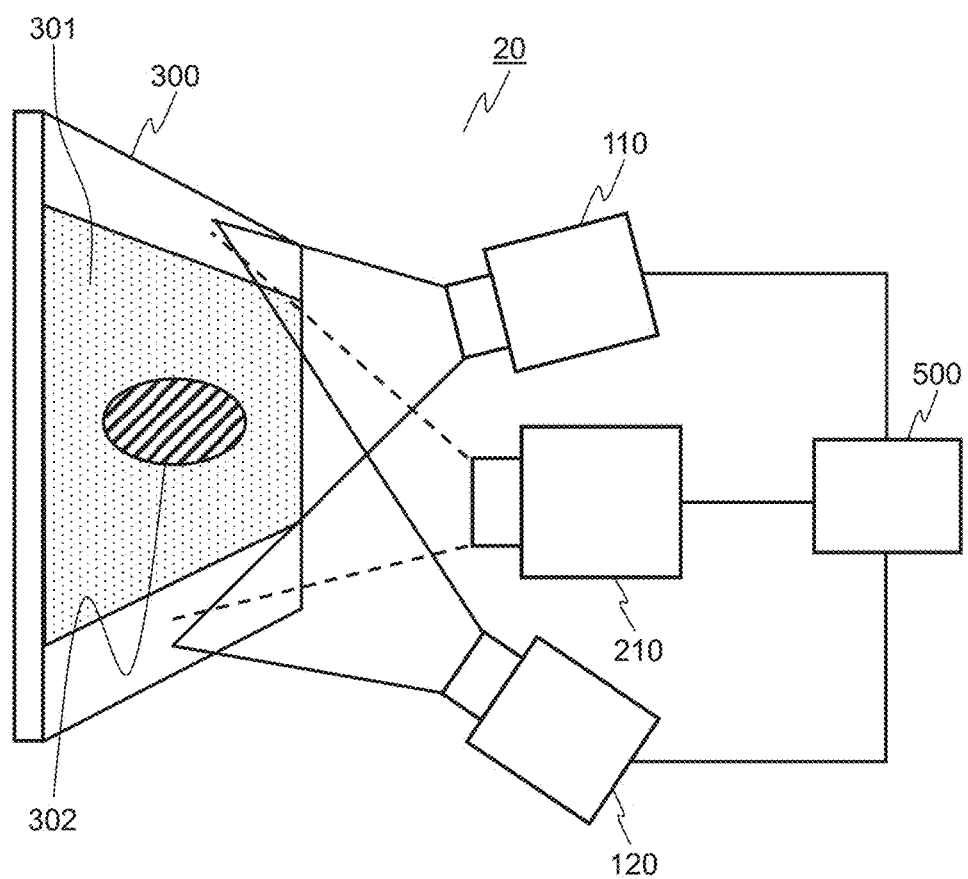
FIG. 12 is a schematic diagram illustrating an imaging system according to a second exemplary embodiment.

FIG. 12 is a schematic diagram illustrating imaging system 20 according to the present exemplary embodiment. As illustrated in FIG. 12, imaging system 20 includes two illumination apparatuses 110 and 120, imaging apparatus 210, and selection apparatus 500. In FIG. 12, the components same as those in the first exemplary embodiment are denoted by the same reference numerals, and the description thereof will be omitted.

Illumination apparatus 110 and illumination apparatus 120 emit illumination light to object 300.

Imaging apparatus 210 captures an image of object 300, to which illumination light is emitted from illumination apparatuses 110 and 120, to generate a captured image.

Selection apparatus 500 is connected to illumination apparatus 110, illumination apparatus 120, and imaging apparatus 210, and selects an illumination apparatus to be used according to information acquired from each apparatus.

As illustrated in FIG. 12, the difference between the first exemplary embodiment and the second exemplary embodiment is such that a plurality of illumination apparatuses is provided. When imaging apparatus 210 scans vertically, both illumination apparatuses are desirably disposed above or below imaging apparatus 210, or each of the illumination apparatuses is disposed below and above imaging apparatus 210. In the present exemplary embodiment, each illumination apparatus is provided at the front and at the back of imaging apparatus 210 in the scanning direction (above and below imaging apparatus 210 in FIG. 12).

Figure 13:
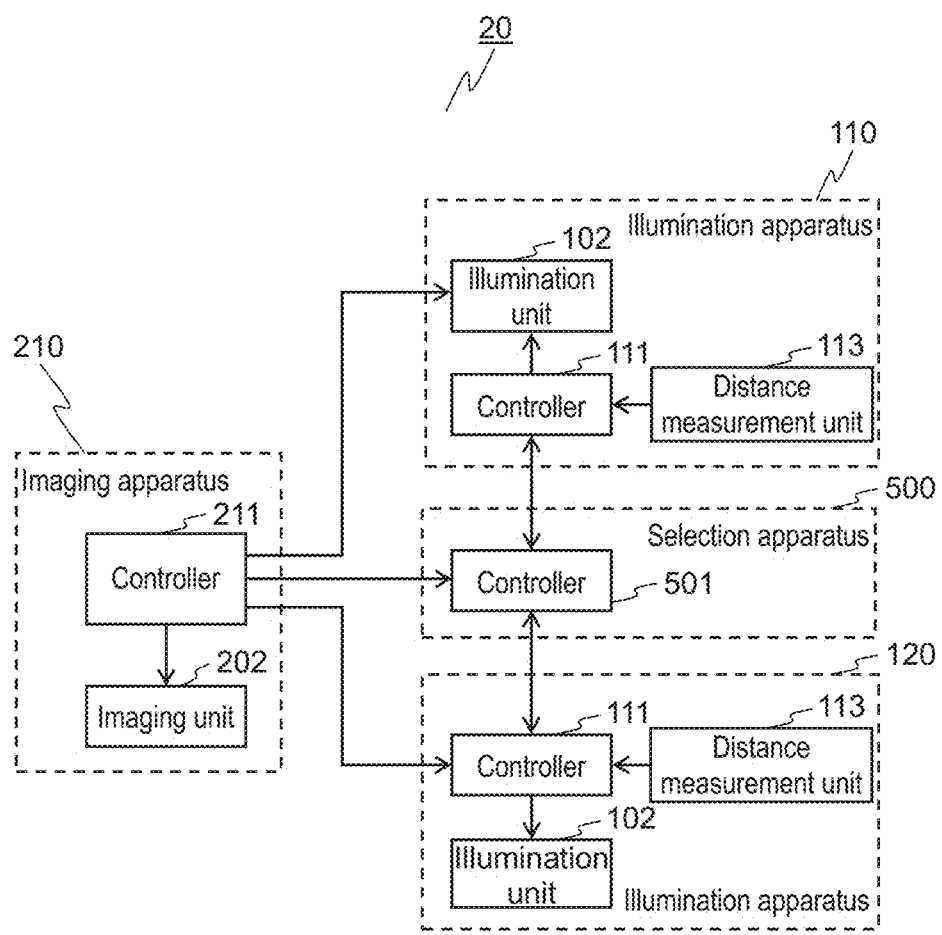
FIG. 13 is a block diagram illustrating a functional configuration of the imaging system according to the second exemplary embodiment.

The detailed configurations of illumination apparatuses 110 and 120, imaging apparatus 210, and selection apparatus 500 will be described below with reference to FIG. 13. FIG. 13 is a block diagram illustrating a functional configuration of imaging system 20 according to the present exemplary embodiment.

[2-1-1. Imaging Apparatus]

Imaging apparatus 210 is a digital video camera or an on-vehicle camera, for example. As illustrated in FIG. 13, imaging apparatus 210 includes controller 211 and imaging unit 202. Imaging apparatus 210 according to the present exemplary embodiment does not have distance measurement unit 203 described in the first exemplary embodiment. Since imaging unit 202 performs the similar operation in the first exemplary embodiment, it is denoted by the same reference numeral, and the description thereof will be omitted.

Controller 211 includes, for example, a non-volatile memory that stores a program, a volatile memory that is a temporarily storage area for executing a program, an input/output port, a processor that executes a program, and the like. Controller 211 controls imaging performed by imaging unit 202 using imaging information. The imaging information includes information relating to imaging, such as a scanning timing or an exposure time Controller 211 transmits the imaging information for controlling imaging unit 202 to illumination apparatus 110 and illumination apparatus 120. Controller 211 also transmits imaging information to selection apparatus 500.

The imaging operation of imaging apparatus 210 is the same as that in the first exemplary embodiment, so that the description thereof will be omitted.

[2-1-2. Illumination Apparatus]

Since illumination apparatus 110 and illumination apparatus 120 have the same configuration, only illumination apparatus 110 will be described below. Illumination apparatus 110 includes controller 111, illumination unit 102, and distance measurement unit 113. Different from the first exemplary embodiment, illumination apparatus 110 according to the present exemplary embodiment has distance measurement unit 113. Since illumination unit 102 performs the similar operation in the first exemplary embodiment, it is denoted by the same reference numeral, and the description thereof will be omitted.

Controller 111 includes, for example, a non-volatile memory that stores a program, a volatile memory that is a temporarily storage area for executing a program, an input/output port, a processor that executes a program, and the like. Controller 111 acquires the imaging information from imaging apparatus 210. Controller 111 causes distance measurement unit 113 to generate distance information using the acquired imaging information. Controller 111 determines an illumination range and an illumination period of illumination light emitted from illumination unit 102 and controls illumination unit 102, using the positional relation of imaging apparatus 210 and illumination apparatus 110 preliminarily set, based on the imaging information and the distance information. The method for determining the illumination range by controller 111 is the same as that in the first exemplary embodiment, so that the description thereof will be omitted.

Illumination unit 102 emits illumination light to object 300 based on the illumination range and the illumination period determined by controller 111.

Distance measurement unit 113 measures a distance to imaging area 301 of object 300 from imaging apparatus 210 with a TOF method using the imaging information output from controller 111, and generates a distance distribution. Distance measurement unit 113 outputs the distance distribution to controller 111 as distance information.

[2-1-3. Selection Apparatus]

Selection apparatus 500 has controller 501. Controller 501 includes, for example, a non-volatile memory that stores a program, a volatile memory that is a temporarily storage area for executing a program, an input/output port, a processor that executes a program, and the like. Controller 501 acquires distance information from illumination apparatuses 110 and 120. Controller 501 also acquires the imaging information from imaging apparatus 210. Controller 501 selects whether illumination apparatus 110 or illumination apparatus 120 is to be used or not using the distance information and position information indicating the positional relation between imaging apparatus 210 and illumination apparatuses 110 and 120 preliminarily set.

[2-2. Operation]

Figure 14:
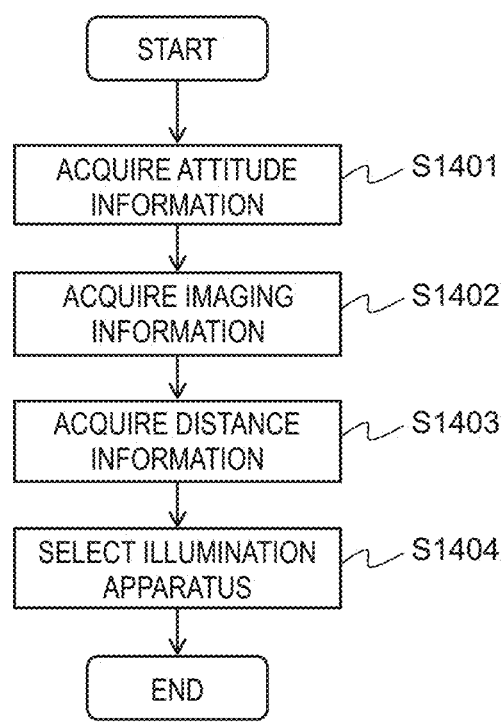
FIG. 14 is a flowchart for describing an illumination selection method according to the second exemplary embodiment.

FIG. 14 is a flowchart illustrating the operation of selection apparatus 500 according to the second exemplary embodiment.

Firstly, controller 501 acquires attitude information of imaging apparatus 210 with respect to illumination apparatus 110 and illumination apparatus 120 (step S1401), the information being preliminarily set. The attitude information includes position information and direction information indicating a three-dimensional relative relation between illumination apparatuses 100 and 120 and imaging apparatus 210.

Next, controller 501 acquires imaging information of imaging unit 202 from imaging apparatus 210 (step S1402). The imaging information includes information relating to a scanning timing, an exposure time, and imaging area 301.

Then, controller 501 acquires distance information to object 300 from imaging apparatus 210 from both of or either one of illumination apparatus 110 and illumination apparatus 120 (step S1403).

Controller 501 selects which one of illumination apparatus 110 and illumination apparatus 120 is used using the acquired imaging information, distance information, and position information (step S1404). The selected illumination apparatus performs the same operation as that in the first exemplary embodiment.

Figure 15:
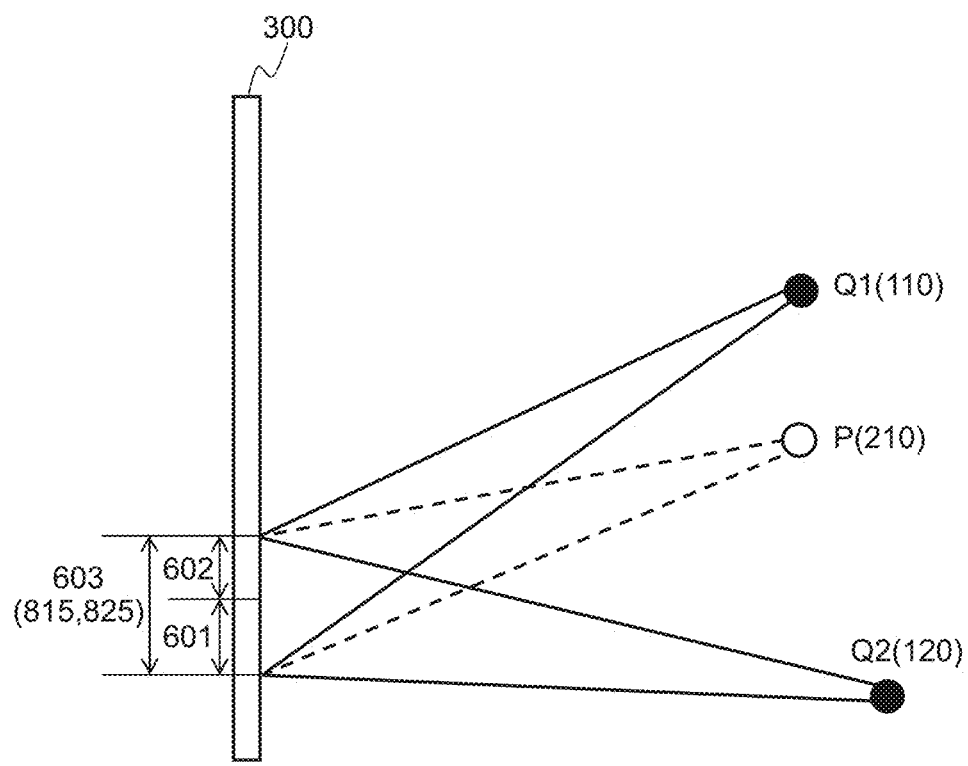
FIG. 15 is a diagram for describing an illumination range according to the second exemplary embodiment.

The method for selecting an illumination apparatus will be described below with reference to FIGS. 15 and 16. FIG. 15 is a diagram for describing an illumination range of the illumination apparatus according to the present exemplary embodiment. FIG. 15 illustrates object 300 that is an outer wall, viewed from a side face.

FIG. 15 illustrates that imaging apparatus 210 captures imaging area 301 from point of view P in a unit of imaging range 603. Imaging range 603 in FIG. 15 is formed by scanning area 601 corresponding to line 1 and scanning area 602 corresponding to line 2 on imaging plane 401 in FIG. 4. FIG. 15 also illustrates that illumination apparatus 110 emits illumination light to imaging range 603 on object 300 from illumination position Q1. FIG. 15 also illustrates that illumination apparatus 120 emits illumination light to imaging range 603 on object 300 from illumination position Q2. Specifically, illumination ranges 815 and 825 of respective illumination apparatuses 110 and 120 are substantially overlapped with imaging range 603.

Controller 501 selects one of the illumination apparatuses, considering the degree of the influence of scattering light due to scattering medium 400 or considering the degree of the influence of scattering light and the amount of light. The degree of the influence of scattering light can be determined based on the size of an overlapped space where the space enclosed by point of view P of imaging apparatus 210 and imaging range 603 and the space enclosed by the illumination position and the illumination range are overlapped with each other.

Figure 16:
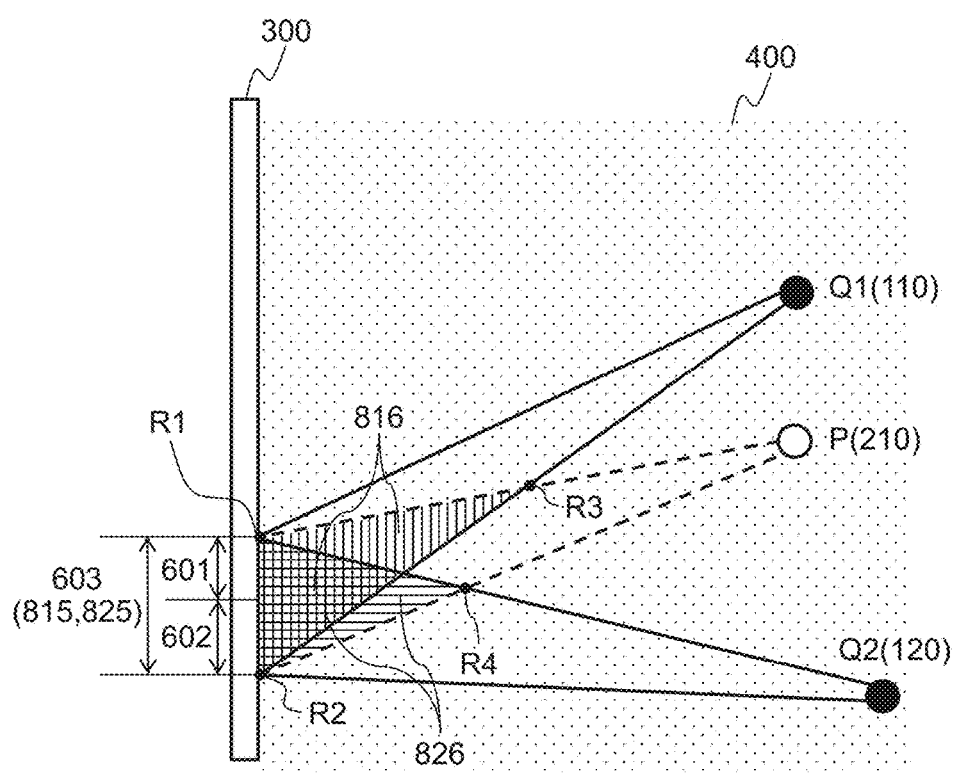
FIG. 16 is a diagram for describing an illumination selection method according to the second exemplary embodiment.

FIG. 16 is a diagram for describing the method for selecting an illumination apparatus according to the present exemplary embodiment. FIG. 16 illustrates that object 300 that is an outer wall, viewed from a side face. In FIG. 16, the components same as those illustrated in FIG. 15 are denoted by the same reference numerals, and the description thereof will be omitted.

In FIG. 16, overlapped space 816 (a vertical stripe portion and checkered portion in FIG. 16) enclosed by point R1, point R2, and point R3 is a space where the space enclosed by illumination position Q1 of illumination apparatus 110 and illumination range 815 (imaging range 603) and the space enclosed by point of view P of imaging apparatus 210 and imaging range 603 are overlapped with each other. In addition, overlapped space 826 (a horizontal stripe portion and checkered portion in FIG. 16) enclosed by point R1, point R2, and point R4 is a space where the space enclosed by illumination position Q2 of illumination apparatus 120 and illumination range 825 (imaging range 603) and the space enclosed by point of view P of imaging apparatus 210 and imaging range 603 are overlapped with each other. It is found from FIG. 16 that overlapped space 816 is larger than overlapped space 826.

Therefore, controller 501 in selection apparatus 500 can determine that overlapped space 816 exerts larger influence of scattering light due to scattering medium 400 on a captured image. That is, controller 501 can determine that the influence of scattering light is smaller in the illumination by illumination apparatus 120 than in the illumination by illumination apparatus 110.

In the case where the amount of illumination light is considered, controller 501 uses the distance information from object 300 to each illumination apparatus. Controller 501 determines that the illumination apparatus closer to object 300 has a larger amount of light. In FIG. 16, controller 501 determines that illumination apparatus 110 has larger amount of light, since illumination position Q1 is closer to object 300. In this case, controller 501 determines that illumination apparatus 120 exerts lesser influence of scattering light based on the size of overlapped spaces 816 and 826 and the amount of light, and thus selects illumination apparatus 120.

In addition, to make a more strict determination, controller 501 may make a determination in consideration of direction dependence of scattering. Here, the direction dependence of scattering indicates an intensity of scattering light according to a direction with respect to a direction of an illumination ray. The direction dependence can be determined based on the positional relation between the imaging apparatus and the illumination apparatus. In FIG. 16, controller 501 compares the distance between point of view P and illumination position Q1 and the distance between point of view P and illumination position Q2. In FIG. 16, since the distance between point of view P and illumination position Q1 is smaller than the distance between point of view P and illumination position Q2, controller 501 determines that illumination apparatus 110 located at illumination position Q1 has higher direction dependence of scattering, and thus selects illumination apparatus 120.

In the case where there is a little difference in an influence of scattering light between two illumination apparatuses 110 and 120, two illumination apparatuses 110 and 120 may simultaneously be selected by placing priority on securing an amount of light, and each illumination apparatus may be controlled to perform the operation of the illumination apparatus described in the first exemplary embodiment.

[2-3. Effects]

As described above, the imaging system according to the present exemplary embodiment includes imaging apparatus 210 that captures an imaging area for every predetermined capturing unit, and a plurality of illumination apparatuses 110 and 120 that emits illumination light to an object of imaging apparatus 210. Controller 501 in selection apparatus 500 has a function of selecting an illumination apparatus to be used out of a plurality of the illumination apparatuses using a distance to imaging apparatus 210 from object 300 present within imaging range 603 and a positional relation between imaging apparatus 210 and a plurality of the illumination apparatuses.

With this configuration, the influence of scattering light due to illumination light can be reduced in the similar manner as in the first exemplary embodiment, while uniform illumination is performed with a plurality of the illumination apparatuses.

Accordingly, imaging apparatus 210 can capture an image having high contrast.

Other Exemplary Embodiments

The first and second exemplary embodiments have been described above as illustrative examples of the technology disclosed in the present application. However, the technology in the present disclosure is not limited to the above, and is applicable to embodiments in which various changes, substitutions, additions, omissions, and the like are made. In addition, a new exemplary embodiment can be made by combining the components described in the first and second exemplary embodiments described above.

The other exemplary embodiments will be described below.

Each of the exemplary embodiments describes that the image sensor scans in only one direction. However, even in the case where a plurality of areas on a plane of an imaging sensor is simultaneously scanned, the similar effect can be obtained by locally illuminating each area that is currently exposed.

Further, in the case where a precise illumination range cannot be obtained due to errors in the precision of detecting a distance to an object, the precision of setting a camera attitude or scanning timing, or an exposure time, a wide illumination range including the errors may be set. In this case as well, the effects of the present exemplary embodiments can be obtained. In addition, in the case where the errors exceed a certain level, the controller may switch the illumination to the normal illumination for illuminating the entire imaging area. This configuration can prevent the imaging area from being not completely captured due to the lack of illumination.

In addition, it may configured such that the lack of illumination on some part of a captured image is determined (based on an area which is darkly captured), and the illumination range is widened to prevent an occurrence of an area that is not captured.

In addition, a contrast enhancement with image processing or haze removal processing (NPL 1, etc.) may additionally be performed. The additional use of image processing can further reduce an influence of scattering light. With only the use of the image processing, an effect reaches a limit due to insufficient tone of an imaging sensor. However, the effect exceeds this limit to enable suppression of an influence of scattering light by using the present exemplary embodiments in combination.

In addition, distance detection is performed by using a TOF method in the first exemplary embodiment. However, it is not limited thereto. The distance detection may be implemented by a stereo method using a plurality of imaging apparatuses, or by using existing distance measurement methods such as a triangulation method using a projected light pattern.

In the case where the distance detection is performed by the stereo method, illumination from a stereo camera is performed based on the present disclosure, by which an image becomes clear, and precision in calculating a stereo distance can be enhanced. Specifically, the precision of calculating the stereo distance is enhanced, resulting in that the precision in calculating an illumination range can also be enhanced. When the stereo camera is used as described above, the precision in the distance detection and the precision in suppressing scattering light can synergistically be improved.

In addition, in the case where a distance to an object is known or constant, an illumination range may be set based on the distance preliminarily set without sequentially detecting a distance.

Further, in the case where a distance is associated with other information that can be referred to, such as a time, an illumination range may be set based on the calculated distance without sequentially detecting a distance.

In addition, in the present disclosure, imaging unit 202 simultaneously exposes the adjacent two lines. However, only a single line may be an illumination target, if an exposure time is decreased. On the contrary, if the exposure time of imaging unit 202 is increased, consecutive three or more lines become an illumination target. As described above, an illumination range depends not only on a scanning timing of an image sensor but also on an exposure time of imaging unit 202, and is determined according to the length of the exposure time.

Further, inverse distortion may be added as an illumination pattern of the illumination unit by using lens distortion information of the imaging unit.

In addition, in each of the exemplary embodiments, the distance measurement unit is provided to either of the imaging apparatus or the illumination apparatus. However, it may be provided to another apparatus, and distance information may be acquired from this apparatus.

In addition, the imaging apparatus and the illumination apparatus in the first exemplary embodiment may be applied to the second exemplary embodiment. On the contrary, the imaging apparatus and the illumination apparatus in the second exemplary embodiment may be applied to the first exemplary embodiment. In either case, distance information may be acquired from either apparatus in the imaging system.

In addition, the imaging apparatus or the illumination apparatus may have the function of the selection apparatus in the second exemplary embodiment.

In addition, although the second exemplary embodiment describes that two illumination apparatuses are used, three or more illumination apparatuses may be used.

Further, in the second exemplary embodiment, the selection of an illumination apparatus is performed at each scanning timing or on a frame basis.

Further, although the object is an outer wall of a building in the present disclosure, any object may be used as an object to be captured by the imaging apparatus.

Notably, since the exemplary embodiments described above are intended to illustrate the technology in the present disclosure, various changes, substitutions, additions, omissions, and the like can be made within the scope of the claims and the scope of equivalents thereof.

The present disclosure is applicable to an illumination apparatus for an imaging apparatus. Specifically, the present disclosure is applicable to illumination of a digital video camera, an on-vehicle camera, an underwater camera, a surveillance camera, or the like.

What is claimed is:

1. An illumination apparatus that emits illumination light to an object, which is to be captured by an imaging apparatus that captures an imaging area for every predetermined capturing unit, the illumination apparatus comprising:
a controller configured to:
acquire imaging information including a scanning timing and to acquire distance information indicating a distance to the imaging apparatus from the object, from the imaging apparatus to calculate an imaging range of the imaging apparatus at each scanning timing;
determine an illumination range at each scanning timing using the distance information and a positional relation between the imaging apparatus and the illumination apparatus; and
control emission of the illumination light to the determined illumination range in synchronization with the scanning timing.

2. The illumination apparatus according to claim 1, wherein the controller is further configured to switch the illumination range to a range including the imaging area using a predetermined condition.

3. The illumination apparatus according to claim 1, wherein the controller is further configured to switch the illumination range to a range including the imaging area, when a scattering intensity of scattering light due to the illumination light is smaller than a predetermined value.

4. The illumination apparatus according to claim 1, wherein the controller is further configured to switch the illumination range to a range including the imaging area, when a positional deviation between the determined illumination range and the illumination light actually emitted exceeds a predetermined degree.

5. The illumination apparatus according to claim 1, wherein the controller is further configured to switch the illumination range to a range including the imaging area, when a value of the distance is outside a predetermined range.

6. The illumination apparatus according to claim 1, wherein
the imaging information includes an exposure time, and
the controller is further configured to determine the illumination range according to a length of the exposure time.

7. The illumination apparatus according to claim 1, further comprising a distance measurement unit configured to calculate the distance information.

8. An imaging system comprising:
an imaging apparatus configured to capture an imaging area for every predetermined capturing unit; and
at least one illumination apparatus configured to emit illumination light to an object to be captured by the imaging apparatus,
wherein the at least one illumination apparatus includes a controller configured to:
acquire imaging information including a scanning timing and to acquire distance information indicating a distance to the imaging apparatus from the object, from the imaging apparatus to calculate an imaging range of the imaging apparatus at each scanning timing;
determine an illumination range at each scanning timing using the distance information and a positional relation between the imaging apparatus and the illumination apparatus; and
control emission of the illumination light to the determined illumination range in synchronization with the scanning timing.

9. The imaging system according to claim 8, wherein, when a plurality of the illumination apparatuses is provided, the controller is further configured to select an illumination apparatus to be used out of the plurality of the illumination apparatuses using the distance information and a positional relation between the imaging apparatus and the plurality of the illumination apparatuses.

10. An illumination method for emitting illumination light from an illumination apparatus to an object, which is to be captured by an imaging apparatus that captures an imaging area for every predetermined capturing unit, the illumination method comprising:
- acquiring imaging information including a scanning timing and acquiring distance information indicating a distance to the imaging apparatus from the object, from the imaging apparatus to calculate an imaging range of the imaging apparatus at each scanning timing;
- determining an illumination range at each scanning timing using the distance information and a positional relation between the imaging apparatus and the illumination apparatus; and
- emitting the illumination light to the determined illumination range in synchronization with the scanning timing.

* * * * *